United States Patent
Alperin (10) Patent No.: US 9,323,821 B2
(45) Date of Patent: Apr. 26, 2016

(54) NETWORK REPOSITORY AUTO SYNC WIRELESS HANDSET

(75) Inventor: Jordan Alperin, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 1298 days.

(21) Appl. No.: 11/399,584

(22) Filed: Apr. 5, 2006

(65) Prior Publication Data

US 2007/0239805 A1 Oct. 11, 2007

(51) Int. Cl.
*G06F 17/30* (2006.01)
*H04L 29/08* (2006.01)

(52) U.S. Cl.
CPC .... *G06F 17/30578* (2013.01); *G06F 17/30174* (2013.01); *H04L 67/1095* (2013.01)

(58) Field of Classification Search
CPC ................................................ G06F 17/30174
USPC .................................................... 707/10, 611
See application file for complete search history.

(56) References Cited

U.S. PATENT DOCUMENTS

| | | | |
|---|---|---|---|
| 4,837,798 A | 6/1989 | Cohen et al. | |
| 5,406,557 A | 4/1995 | Baudoin | |
| 5,410,691 A | 4/1995 | Taylor | |
| 5,479,411 A | 12/1995 | Klein | |
| 5,524,137 A | 6/1996 | Rhee | |
| 5,633,484 A | 5/1997 | Zancho et al. | |
| 5,689,550 A | 11/1997 | Garson et al. | |
| 5,724,410 A | 3/1998 | Parvulescu et al. | |
| 5,742,905 A | 4/1998 | Pepe et al. | |
| 5,920,835 A | 7/1999 | Huzenlaub et al. | |
| 5,974,449 A | 10/1999 | Chang et al. | |
| 6,014,429 A | 1/2000 | LaPorta et al. | |
| 6,081,830 A | 6/2000 | Schindler | |
| 6,094,681 A | 7/2000 | Shaffer et al. | |
| 6,154,772 A | 11/2000 | Dunn et al. | |
| 6,173,259 B1 | 1/2001 | Bijl et al. | |
| 6,345,279 B1 | 2/2002 | Li et al. | |
| 6,353,827 B1 | 3/2002 | Davies et al. | |
| 6,366,651 B1 | 4/2002 | Griffith et al. | |
| 6,385,611 B1 | 5/2002 | Cardona | |
| 6,407,680 B1 | 6/2002 | Lai et al. | |
| 6,421,733 B1 | 7/2002 | Tso et al. | |
| 6,438,221 B1 | 8/2002 | Lee et al. | |
| 6,442,589 B1 | 8/2002 | Takahashi et al. | |
| 6,442,606 B1 | 8/2002 | Subbaroyan et al. | |
| 6,459,776 B1 | 10/2002 | Aktas et al. | |

(Continued)

FOREIGN PATENT DOCUMENTS

WO WO 97/23082 6/1997

OTHER PUBLICATIONS

U.S. Appl. No. 11/228,446, filed Sep. 15, 2005, Jordan Alperin.

(Continued)

*Primary Examiner* — Etienne Leroux
*Assistant Examiner* — Chelcie Daye
(74) *Attorney, Agent, or Firm* — Swanson & Bratschun, L.L.C.

(57) ABSTRACT

According to the invention, one embodiment of a method and program of synchronizing an end device with a data repository is disclosed. In another embodiment, a method for synchronizing data, both multimedia and non-multimedia, with a repository is provided. In an exemplary embodiment, a method for synchronizing data with multiple repositories is provided. In another embodiment a software program to implement said methods is provided.

20 Claims, 6 Drawing Sheets

(56) References Cited

U.S. PATENT DOCUMENTS

| | | |
|---|---|---|
| 6,463,463 B1 | 10/2002 | Godfrey et al. |
| 6,483,899 B2 | 11/2002 | Agraharam et al. |
| 6,556,217 B1 | 4/2003 | Makipaa et al. |
| 6,564,264 B1 | 5/2003 | Creswell et al. |
| 6,631,181 B1 | 10/2003 | Bates et al. |
| 6,675,261 B2 | 1/2004 | Shandony |
| 6,694,004 B1 | 2/2004 | Knoerie et al. |
| 6,754,904 B1 | 6/2004 | Cooper et al. |
| 6,768,789 B1 | 7/2004 | Wilk |
| 6,775,658 B1 | 8/2004 | Zothner |
| 6,782,253 B1 | 8/2004 | Shteyn et al. |
| 6,799,174 B2 | 9/2004 | Chipman et al. |
| 6,801,793 B1 | 10/2004 | Aarnio et al. |
| 6,816,582 B2 | 11/2004 | Levine |
| 6,826,173 B1 | 11/2004 | Kung et al. |
| 6,826,407 B1 | 11/2004 | Helferich |
| 6,832,259 B2 | 12/2004 | Hymel et al. |
| 6,832,377 B1 | 12/2004 | Havemose |
| 6,879,838 B2 | 4/2005 | Rankin et al. |
| 6,882,709 B1 | 4/2005 | Sheriock et al. |
| 6,938,087 B1 | 8/2005 | Abu-Samaha |
| 6,964,014 B1 | 11/2005 | Parish |
| 6,977,993 B2 | 12/2005 | Starbuck et al. |
| 6,988,128 B1 | 1/2006 | Alexander et al. |
| 7,013,331 B2 | 3/2006 | Das |
| 7,069,301 B2 | 6/2006 | Jerbi et al. |
| 7,069,309 B1 | 6/2006 | Dodrill et al. |
| 7,072,056 B1 | 7/2006 | Greaves et al. |
| 7,076,734 B2 | 7/2006 | Wolff et al. |
| 7,106,473 B2 | 9/2006 | Sekiguchi |
| 7,110,955 B1* | 9/2006 | Barhnart ............ G06Q 30/04 705/3 |
| 7,120,870 B1 | 10/2006 | Nakamura |
| 7,188,073 B1 | 3/2007 | Tam et al. |
| 7,212,543 B1 | 5/2007 | Arwald et al. |
| 7,212,614 B1 | 5/2007 | Burg et al. |
| 7,219,163 B2 | 5/2007 | Robinson et al. |
| 7,224,774 B1 | 5/2007 | Brown et al. |
| 7,272,662 B2 | 9/2007 | Chesnais et al. |
| 7,277,529 B1 | 10/2007 | Wuthnow et al. |
| 7,295,752 B1 | 11/2007 | Jain et al. |
| 7,310,329 B2 | 12/2007 | Vieri et al. |
| 7,310,625 B2* | 12/2007 | Wu ................. G06N 5/022 706/50 |
| 7,383,308 B1 | 6/2008 | Groves et al. |
| 7,385,875 B2 | 6/2008 | May et al. |
| 7,526,572 B2 | 4/2009 | Omar et al. |
| 7,551,727 B2 | 6/2009 | Howell et al. |
| 7,587,033 B2 | 9/2009 | Crago et al. |
| 7,596,369 B2 | 9/2009 | Alperin et al. |
| 7,688,962 B1 | 3/2010 | Knoerie et al. |
| 8,078,476 B2 | 12/2011 | Alperin et al. |
| 8,095,664 B2* | 1/2012 | Yamaguchi ........... H04L 12/66 709/227 |
| 8,320,535 B2 | 11/2012 | Alperin et al. |
| 8,799,512 B2 | 8/2014 | Alperin et al. |
| 8,819,751 B2 | 8/2014 | Alperin |
| 9,271,020 B2 | 2/2016 | Alperin |
| 2002/0026457 A1 | 2/2002 | Jensen |
| 2002/0032589 A1 | 3/2002 | Shah |
| 2002/0075519 A1 | 6/2002 | Konsella et al. |
| 2002/0076027 A1 | 6/2002 | Bernnan et al. |
| 2002/0082030 A1 | 6/2002 | Berndt et al. |
| 2002/0087704 A1 | 7/2002 | Chesnais et al. |
| 2002/0098831 A1 | 7/2002 | Castell et al. |
| 2002/0102965 A1 | 8/2002 | Mandahl et al. |
| 2002/0111991 A1 | 8/2002 | Wood et al. |
| 2002/0120451 A1 | 8/2002 | Kato et al. |
| 2002/0128036 A1 | 9/2002 | Yach et al. |
| 2002/0144273 A1 | 10/2002 | Reto |
| 2002/0156871 A1 | 10/2002 | Munarriz et al. |
| 2002/0169823 A1 | 11/2002 | Coulombe et al. |
| 2002/0170067 A1 | 11/2002 | Norstrom et al. |
| 2002/0174194 A1 | 11/2002 | Mooney et al. |
| 2002/0194150 A1 | 12/2002 | Bates et al. |
| 2003/0041058 A1 | 2/2003 | Ibuki et al. |
| 2003/0088633 A1 | 5/2003 | Chiu et al. |
| 2003/0097262 A1 | 5/2003 | Nelson |
| 2003/0101450 A1 | 5/2003 | Davidsson et al. |
| 2003/0120717 A1 | 6/2003 | Callaway et al. |
| 2003/0147369 A1 | 8/2003 | Singh et al. |
| 2003/0149646 A1 | 8/2003 | Chen et al. |
| 2003/0172139 A1 | 9/2003 | Srinivasan et al. |
| 2003/0172175 A1 | 9/2003 | McCormack et al. |
| 2003/0177408 A1* | 9/2003 | Fields ................. G06Q 10/10 713/400 |
| 2004/0044663 A1 | 3/2004 | Horompoly |
| 2004/0054719 A1 | 3/2004 | Daigle et al. |
| 2004/0058673 A1 | 3/2004 | Irlam et al. |
| 2004/0075698 A1* | 4/2004 | Gao .................... G11B 27/34 715/854 |
| 2004/0091089 A1 | 5/2004 | Wynn |
| 2004/0170155 A1 | 9/2004 | Omar et al. |
| 2004/0199665 A1 | 10/2004 | Omar et al. |
| 2004/0236753 A1 | 11/2004 | Pocari |
| 2004/0268265 A1 | 12/2004 | Berger |
| 2005/0015311 A1 | 1/2005 | Frantz et al. |
| 2005/0015443 A1 | 1/2005 | Levine et al. |
| 2005/0018653 A1 | 1/2005 | Phillips et al. |
| 2005/0033806 A1 | 2/2005 | Harvey et al. |
| 2005/0037762 A1 | 2/2005 | Gurbani et al. |
| 2005/0053206 A1 | 3/2005 | Chingon et al. |
| 2005/0075097 A1 | 4/2005 | Lehikoinen et al. |
| 2005/0086282 A1 | 4/2005 | Anderson et al. |
| 2005/0089149 A1 | 4/2005 | Elias |
| 2005/0091327 A1 | 4/2005 | Koch |
| 2005/0101343 A1 | 5/2005 | Hsiao |
| 2005/0144557 A1 | 6/2005 | Li et al. |
| 2005/0201533 A1 | 9/2005 | Emam et al. |
| 2005/0235307 A1 | 10/2005 | Relan et al. |
| 2005/0246666 A1 | 11/2005 | Kalinoski et al. |
| 2005/0254635 A1 | 11/2005 | Koretsky et al. |
| 2005/0262542 A1 | 11/2005 | DeWeese et al. |
| 2006/0017983 A1 | 1/2006 | Syri et al. |
| 2006/0026302 A1 | 2/2006 | Bennett et al. |
| 2006/0095868 A1 | 5/2006 | Sawada et al. |
| 2006/0104293 A1 | 5/2006 | Kopp et al. |
| 2006/0104430 A1 | 5/2006 | Kirkland et al. |
| 2006/0104431 A1 | 5/2006 | Emery et al. |
| 2006/0116918 A1* | 6/2006 | Flora ............. G06Q 10/063116 705/7.19 |
| 2006/0123082 A1 | 6/2006 | Digate et al. |
| 2006/0156251 A1 | 7/2006 | Suhail et al. |
| 2006/0168065 A1 | 7/2006 | Martin |
| 2006/0184624 A1 | 8/2006 | Thukral |
| 2006/0206941 A1 | 9/2006 | Collins |
| 2006/0218575 A1 | 9/2006 | Blair |
| 2006/0250991 A1 | 11/2006 | Jabri et al. |
| 2006/0265397 A1 | 11/2006 | Bryan et al. |
| 2006/0265427 A1 | 11/2006 | Cohen et al. |
| 2006/0277316 A1 | 12/2006 | Wang et al. |
| 2007/0016643 A1 | 1/2007 | Boss et al. |
| 2007/0058569 A1 | 3/2007 | McMenamin et al. |
| 2007/0079010 A1 | 4/2007 | Heredia et al. |
| 2007/0097394 A1 | 5/2007 | Zaima et al. |
| 2007/0104184 A1 | 5/2007 | Ku et al. |
| 2007/0139513 A1 | 6/2007 | Fang |
| 2007/0169148 A1 | 7/2007 | Oddo et al. |
| 2007/0174448 A1 | 7/2007 | Ahuja et al. |
| 2007/0198648 A1 | 8/2007 | Allen et al. |
| 2007/0239833 A1 | 10/2007 | Alperin et al. |
| 2007/0239880 A1 | 10/2007 | Alperin et al. |
| 2007/0239895 A1 | 10/2007 | Alperin et al. |
| 2008/0177616 A1 | 7/2008 | Nemirofsky et al. |
| 2011/0167122 A1 | 7/2011 | Groves et al. |
| 2014/0325538 A1 | 10/2014 | Alperin |

OTHER PUBLICATIONS

U.S. Appl. No. 11/255,089, filed Oct. 19, 2005, Jordan Alperin et al.
U.S. Appl. No. 11/268,011, filed Nov. 2, 2005, Jordan Alperin et al.
U.S. Appl. No. 11/293,028, filed Dec. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.

(56) References Cited

OTHER PUBLICATIONS

U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
*Goodlink Business Brochure*, Enterprise Edition 4.5, Good Technology, Inc., www.good.com, 4 pages.
Comcast online storage, Comcast.net, 1 page.
Secure Online Storage, http://www.xdrive.com, Nov. 9, 2005, 2 pages.
Online Backup, Online Storage, Collaboration and Data Sharing, http://www.ibackup.com, Nov. 9, 2005, 1 page.
File and Data Storage, Transfer, Delivery Since 1999, http://www.mydocsonline.com, Nov. 9, 2005, 2 pages.
Share Videos and Photos—Online MP3 Storage and Access, http://www.streamload.com, Nov. 9, 2005, 1 page.
Koontz, Alan "Find in Page Script", Oct. 13, 1969, Dynamic Drive, "http:/www.dynamicdrive.com/dynamicindex11/findpage.htm", 2 pages.
The Web Design Resource, "Manipulating Font Size and Color", Jun. 27, 1998, The Web Design Resource, 2 pages.
U.S. Appl. No. 11/228,446, Final Office Action dated May 18, 2010, 15 pages.
U.S. Appl. No. 11/228,446, Final Office Action dated Jul. 24, 2009, 11 pages.
U.S. Appl. No. 11/228,446, Final Office Action dated Oct. 24, 2008, 6 pages.
U.S. Appl. No. 11/228,446, Office Action dated Jan. 4, 2010, 17 pages.
U.S. Appl. No. 11/228,446, Office Action dated Jun. 3, 2008, 13 pages.
U.S. Appl. No. 11/228,446, Office Action dated Mar. 3, 2009, 12 pages.
U.S. Appl. No. 11/228,446; Interview Summary dated Nov. 28, 2011; 3 pages.
U.S. Appl. No. 11/399,096; Final Office Action dated Dec. 6, 2011; 15 pages.
U.S. Appl. No. 11/228,446; Issue Notification dated May 30, 2012; 1 page.
U.S. Appl. No. 11/228,446; Examiner-Initiated Interview Summary dated Nov. 10, 2011; 2 pages.
U.S. Appl. No. 11/255,089, Final Office Action dated Sep. 24, 2009.
U.S. Appl. No. 11/255,089, Appeal Brief dated Apr. 26, 2010, 17 pages.
U.S. Appl. No. 11/255,089, Office Action dated Mar. 10, 2009, 17 pages.
U.S. Appl. No. 11/255,089, Office Action dated Oct. 8, 2008, 18 pages.
U.S. Appl. No. 11/266,011, Office Action dated Dec. 22, 2008, 12 pages.
U.S. Appl. No. 11/266,011, Office Action dated Aug. 19, 2010, 19 pages.
U.S. Appl. No. 11/266,011, Office Action dated Jun. 10, 2009, 12 pages.
U.S. Appl. No. 11/266,011, Final Office Action dated Jan. 28, 2010, 11 pages.
U.S. Appl. No. 11/266,011; Notice of Allowance dated Oct. 7, 2011; 18 pages.
U.S. Appl. No. 11/266,011; Issue Notification dated Apr. 11, 2012; 1 page.
U.S. Appl. No. 11/292,801, Office Action dated Mar. 3, 2009, 9 pages.
U.S. Appl. No. 11/293,028, Final Office Action dated Apr. 15, 2009, 12 pages.
U.S. Appl. No. 11/293,028, Final Office Action dated Mar. 17, 2008, 11 pages.
U.S. Appl. No. 11/293,028, Office Action dated Aug. 13, 2008, 9 pages.
U.S. Appl. No. 11/293,028, Office Action dated Nov. 14, 2007, 11 pages.
U.S. Appl. No. 11/293,028, Notice of Allowance dated Oct. 30, 2009, 16 pages.
U.S. Appl. No. 11/399,096, Final Office Action dated Jun. 17, 2009, 11 pages.
U.S. Appl. No. 11/399,096, Office Action dated Dec. 7, 2009, 10 pages.
U.S. Appl. No. 11/399,096, Office Action dated Jan. 22, 2009, 14 pages.
U.S. Appl. No. 11/399,096, Final Office Action dated May 24, 2010, 12 pages.
U.S. Appl. No. 11/399,096, Office Action dated Oct. 27, 2010, 11 pages.
U.S. Appl. No. 11/399,096, Notice of Panel Decision from Pre-Appeal Brief Review dated May 23, 2011, 2 pages.
U.S. Appl. No. 11/399,096, Office Action dated Jul. 12, 2011, 14 pages.
U.S. Appl. No. 11/399,098, Notice of Allowance dated Jun. 2, 2009, 6 pages.
U.S. Appl. No. 11/399,098, Office Action dated Aug. 25, 2008, 13 pages.
U.S. Appl. No. 11/399,098, Terminal Disclaimer dated Nov. 25, 2008, 1 page.
U.S. Appl. No. 11/399,098, Requirement for Election/Restriction dated Feb. 25, 2009, 6 pages.
U.S. Appl. No. 11/399,098, Response to Requirement for Election/Restriction dated Mar. 11, 2009, 10 pages.
U.S. Appl. No. 11/399,098, filed Apr. 5, 2006, now U.S. Pat. No. 7,596,369, 16 pages.
U.S. Appl. No. 11/399,585, Office Action dated Mar. 24, 2009, 16 pages.
U.S. Appl. No. 11/399,585, Final Office Action dated Nov. 4, 2009, 10 pages.
U.S. Appl. No. 11/399,585; Office Action dated Jul. 18, 2011, 20 pages.
U.S. Appl. No. 11/399,585, Non-Final Office Action dated Sep. 21, 2010, 15 pages.
U.S. Appl. No. 11/399,585; Non Final Office Action dated Jan. 4, 2012; 19 pages.
U.S. Appl. No, 11/388,585; Final Rejection dated May 1, 2012; 35 pages.
U.S. Appl. No. 11/400,643, Final Office Action dated Jul. 27, 2009, 18 pages.
U.S. Appl. No. 11/400,643, Office Action dated Jan. 9, 2009, 17 pages.
U.S. Appl. No. 11/400,643; Notice of Panel Decision dated Jul. 11, 2011; 2 pages.
U.S. Appl. No. 11/400,643; Issue Notification dated Jun. 13, 2012; 1 page.
U.S. Appl. No. 11/400,643; Notice of Allowance dated Mar. 8, 2012; 14 pages.
U.S. Appl. No. 11/400,644, Office Action dated Jan. 21, 2009, 16 pages.
U.S. Appl. No. 11/400,616, Final Office Action dated Feb. 1, 2010, 16 pages.
U.S. Appl. No. 11/400,616, Office Action dated Jul. 13, 2009, 21 pages.
U.S. Appl. No. 11/400,616 CT; Non Final Office Action dated Mar. 8, 2012; 26 pages.
U.S. Appl. No. 11/399,097, Final Office Action dated Sep. 1, 2010, 10 pages.
U.S. Appl. No. 11/399,097, Office Action dated Mar. 26, 2010, 12 pages.
U.S. Appl. No. 11/399,097, Requirement for Election/Restriction dated Jan. 26, 2010, 6 pages.
U.S. Appl. No. 11/399,097, Response to Requirement for Election/Restriction dated Feb. 22, 2010, 1 page.
U.S. Appl. No. 11/383,620, Final Office Action dated Mar. 28, 2011, 27 pages.

(56) References Cited

OTHER PUBLICATIONS

U.S. Appl. No. 11/383,620; Non Final Office Action dated Aug. 31, 2011; 21 pages.
U.S. Appl. No. 11/383,620; Final Office Action dated Feb. 3, 2012; 18 pages.
U.S. Appl. No. 11/400,616; Corrected Notice of Allowability dated Sep. 7, 2012; 11 pages.
U.S. Appl. No. 11/400,616; Corrected Notice of Allowability dated Oct. 26, 2012; 12 pages.
U.S. Appl. No. 11/400,616; Notice of Allowance dated Jul. 3, 2012; 17 pages.
U.S. Appl. No. 11/400,616; Issue Notification dated Nov. 7, 2012; 1 page.
U.S. Appl. No. 11/383,620; Non-Final Office Action dated Oct. 3, 2013; 24 pages.
U.S. Appl. No. 11/255,089; Withdrawal of Notice of Abandonment dated Oct. 10, 2013; 2 pages.
U.S. Appl. No. 11/255,089; Non-Final Rejection dated Nov. 22, 2013; 35 pages.
U.S. Appl. No. 11/255,089; Notice of Panel Decision dated Jul. 1, 2013; 9 pages.
U.S. Appl. No. 11/255,089; Notice of Allowance dated Mar. 31, 2014; 36 pages.
U.S. Appl. No. 11/383,620; Notice of Allowance dated Apr. 14, 2014; 16 pages.
U.S. Appl. No. 11/399,097; Notice of Allowance dated Jul. 29, 2011; 20 pages.
U.S. Appl. No. 11/399,097; Notice of Allowance dated Aug. 23, 2011; 5 pages.
U.S. Appl. No. 11/399,097; Supplemental Notice of Allowability dated Oct. 20, 2011; 5 pages.
U.S. Appl. No. 11/780,045; Office Communication dated Nov. 8, 2011; 2 pages.
U.S. Appl. No. 11/399,097; Issue Notification dated Nov. 22, 2011; 1 page.
U.S. Appl. No. 11/399,097; Supplemental Notice of Allowability dated Oct. 31, 2011; 5 pages.
U.S. Appl. No. 11/255,089; Issue Notification dated Jul. 16, 2014; 1 page.
U.S. Appl. No. 11/383,620; Issue Notification dated Aug. 6, 2014; 1 page.
U.S. Appl. No. 14/330,181; Non-Final Rejection dated May 28, 2015; 36 pages.
U.S. Appl. No. 14/330,181; Notice of Allowance dated Oct. 23, 2015; 17 pages.
U.S. Appl. No. 14/330,181; Issue Notification dated Feb. 3, 2016; 1 page.

\* cited by examiner

NETWORK REPOSITORY AUTO SYNC WIRELESS HANDSET

BACKGROUND OF THE INVENTION

This invention relates generally to the field of data storage systems. More specifically, the invention relates to methods and systems for synchronizing end devices with one or more data stores and/or other end devices.

The use of data stores by individuals and other entities has become more widespread in recent years given increases in data access speeds and decreases in costs of storage capacity. For example, services such as IBackup™, My Docs Online™, StreamLoad™ and Xdrive™ offer inexpensive storage of data through the use of any internet connection. Also, internet service providers such as Comcast™ provide internet accessible data storage to customers who purchase internet access services.

Meanwhile, the number of end devices that may be connected with these systems has increased dramatically due to high user demand for new functionality and lower manufacturing costs. These end devices include cellular phones, personal data assistants, portable music players, computers, television service receivers, and video game consoles such as the Microsoft Xbox™, Xbox 360™ and Sony PlayStation 2™.

Currently, only limited methods exist for synchronizing end devices to data stores. The types of network connectivity employed to synchronize end devices to the data stores is limited, as is the type of data that may be synchronized. For example, a Blackberry™ handheld computer may, in certain circumstances, only be able to communicate over proprietary networks, and then only be able to synchronize e-mail, calendar and contact information. As another example, cellular phones may only be able to synchronize to data held in a data store maintained by the cellular phone service provider, but not to data on an internet accessible data store. Additionally, certain data repositories are only configured to store certain data types, meaning that end devices must complete multiple, separate, and often user initiated synchronizing operations to synchronize multiple data types with multiple repositories.

Many of these methods also require user intervention to initiate synchronization. These methods may require that a user instruct an end device to initiate synchronization rather than conduct routine automatic synchronization whenever network connectivity is present. Likewise, other methods presently known in the art may allow for automatic synchronization of certain data types on certain networks, but require physical docking and/or user initiation of synchronization of remaining data types.

Hence, there is a need for methods that allow for more complete and automatic synchronization of end devices with data stores and/or other end devices.

BRIEF SUMMARY OF THE INVENTION

In one embodiment the invention provides a method for synchronizing an end device. The method may consist of storing data on the end device, where data consists of multimedia data and non-multimedia data. The method may further consist of connecting the end device with a data repository. The method may compare data on the end device with data on the data repository to determine if any of the data is more recent on the end device or the data repository. The method may also provide a portion of the data from the end device to the data repository, or from the data repository to the end device, possibly based on the comparison of the data.

In such an embodiment, the end device may, merely by way of example, be a cellular phone, a personal data assistant, a portable music player, a handheld computer, a notebook computer, a laptop computer, a desktop computer, a video game console, a cable television receiver, and/or a satellite television receiver. In some embodiments, connecting the end device with the data repository may consist of the end device entering a wireless phone network, the end device entering a wireless local area network, the end device entering a wireless wide area network, the end device connecting with a wired phone network, the end device connecting with a wired local area network, the end device connecting with a wired wide are network, the end device connecting to a cable television system, and/or the end device connecting with a satellite television system.

In one aspect, a portion of the data may be data header information. Data header information may, merely by way of example, be an email header, a file name, a file size, a file type, and/or other descriptive information. In another aspect of the invention, multimedia data may include various file types, including, but not limited to, a Joint Photographic Experts Group ("JPG") file, a Graphic Interchange Format ("GIF") file, a Motion Picture Expert Group ("MPG") file, an Audio Video Interleave ("AVI") file, a Motion Picture Expert Group Audio Layer 3 ("MP3") file, a Motion Picture Expert Group 4 Audio ("M4A") file, a Motion Picture Expert Group 4 Audio Protected ("M4P") file, and/or a Windows Media Audio ("WMA") file. Non-multimedia data may, merely by way of example, consist of calendar appointments, contacts, text, email, and/or settings.

In another embodiment, the method may further consist of registering with the data repository. Registering with the data repository may possibly consist of purchasing a service plan from a service provider, opening an email account with a service provider, and/or storing data at the data repository. In another embodiment of the invention, the method may further consist of accessing the data repository with a web browser on an end device.

In one particular aspect, the comparison of data on the end device with data on the data repository may occur periodically. In another aspect, the comparison of data on the end device with data on the data repository may occur with or without user intervention.

In some embodiments of the invention, the data repository may be connected with a communication subsystem and further connected with a translation subsystem. The communication subsystem may direct communication with the data repository. The translation subsystem may translate communication with the data repository.

In another embodiment of the invention, a method for automatically synchronizing an end device with multiple data repositories is provided. The method may consist of storing data on an end device. The data may consist of multimedia data and non-multimedia data. The method may also consist of connecting the end device with two data repositories. Furthermore, the method may consist of comparing data on the end device with data on the two repositories to determine if the data is more recent on the end device or on either of the two data repositories. The method may also consist of providing data from the end device to one of the data repositories, or from one or both of the data repositories to the end device, possibly based on the comparison of the data.

In one aspect, connecting the end device with two data repositories may consist of connecting the end device with a first data repository, connecting the first data repository with a second data repository, and connecting the end device with the second data repository through the connection made between the first data repository and the second data repository. In another aspect, connecting the end device with the second data repository through the connection made between the first data repository and the second data repository may consist of a communication between the end device and the first data repository, a communication between the first data repository and the second data repository based on the communication between the end device and the first data repository, and a communication between the first data repository and the end device based on the communication between the first data repository and the second data repository.

In some embodiment of the invention, a method for synchronizing at least two end devices is provided. The method may consist of connecting both a first and a second end device with a data repository. The method may further store data on the first end device. This data may consist of multimedia data and non-multimedia data. The method may provide at least a portion of the data from the first end device to the data repository. This data may be stored on the first data repository. The first data may provide at least a portion of the data from the data repository to the second end device. The method may then store on the second end device at least a portion of the data provided by the data repository.

In one aspect of these embodiments, the method may provide at least a portion of the data from the first end device to the data repository because the data is new to the first end device. In another aspect of these embodiments, the method may provide at least a portion of the data from the data repository to the second end device because the data stored on the data repository is new to the data repository. In another aspect, the method may provide at least a portion of the data from the data repository to the second end device based at least in part upon a comparison of the data stored on the data repository and the data stored on the second end device.

BRIEF DESCRIPTION OF THE DRAWINGS

The present invention is described in conjunction with the appended figures.

DETAILED DESCRIPTION OF THE INVENTION

One embodiment of the invention provides a method for synchronizing an end device. In such an embodiment, the method may consist of storing data on an end device, where the data may consist of multimedia data and non-multimedia data. The method may further consist of connecting the end device with a data repository and comparing data on the end device with data on the data repository to determine if the data is more recent on the end device or on the data repository. The method may possibly compare only a portion of any data on the end device to data on the data repository. Merely by way of example, the method may only compare metadata or characteristics of specific data. The method may then provide data from the end device to the data repository or from the data repository, to the end device based upon the comparison of the data.

In some embodiments, the method may connect the end device with at least two data repositories. The end devices may connect directly or indirectly with any one data repositories. Merely by way of example, an indirect connection with a data repository may be made through multiple networks or possibly through another data repository. Each data repository may store certain types of data. Merely by way of example, some data repositories may store only: multimedia data; non-multimedia data; image files; video files; audio files; contacts; calendar appointments; e-mail; or some subset of the aforementioned data. This may be because the provider of the data repository only offers services related to particular end devices which only concern themselves with certain data types. Numerous other reasons may also require or permit limiting of the types of data stored on a certain repository. The method may compare data on the end device with data on all connected data repositories to determine if the data is more recent on the end device or on any of the data repositories. In one aspect, the method may provide data from the end device to any one of the data repositories or from at least one data repository to the end device based upon the comparison of the data.

In some embodiments, a method for synchronizing multiple end devices with one or more data repositories is provided. The method may connect multiple end devices with one or more data repositories. The method may make an initial comparison of the data stored on the data repositories and the data stored on the end devices. The method may then provide data from any of the data repositories or end devices to any of the end devices or data repositories, based at least in part on the comparison of the data. In some embodiments only a portion of the data not present on either the end devices or the data repositories may be provided. Merely by way of example, communication logs of calls made with a first end device that is a cellular phone may be provided in full to a particular data repository, but only a portion of that data would be provided to a second end device that is a replacement cellular phone should the first end device become lost or malfunction. So in such an example, while the data repository may contain two years of phone call logs, the method might possibly only provide ten days of phone call logs to the second end device that is the replacement cellular phone.

The method may also store data on any one or more of the end devices. The method may then provide at least a portion of the stored data to one or more of the data repositories. In one aspect, the method may provide at least a portion of the stored data to one or more of the data repositories because the stored data on the end device is new to the end device. Data may be recognized as new to the end device because, merely by way of example, it was created by a user of the end device and not provided to the end device by another end device or data repository. By way of another example, data may be recognized as new to the end device because it is or is not flagged within certain metadata. Multiple methods, known in the art, may be used within the scope of the invention to determine that data is new to the end device.

The method may store on one or more of the data repositories at least a portion of the data provided from the end device(s). Differing portions of the data may possibly be stored on different data repositories. The method may provide at least a portion of the stored data to other end devices besides the end device which provided the stored data. As above, the method may provide at least a portion of the stored data to other end devices besides the end device which provided the stored data because the stored data is recognized as being new to one or more data repositories. Data may be recognized as new to any one data repository because it came from an end device that provided the data because it was new on the end device. Multiple methods, known in the art, may be used within the scope of the invention to determine that data is new to any one of the data repositories. Data provided by the data repositories to end devices which did not originally provide the data may then be stored by the method on such end devices.

In some embodiments, a software program stored on a computer may consist of instructions executable by the computer to conduct one or more of the embodiments of the invention. The computer may or may not be integral with any or all data repositories.

Merely by way of example, the end device may be a cellular phone, a personal data assistant, a portable music player, a handheld computer, a notebook computer, a laptop computer, a desktop computer, a video game console, a cable television receiver, and/or a satellite television receiver. Connecting the end device with a data repository may occur in a variety of ways, including, but not limited to, an end device entering a wireless phone network, an end device entering a wireless local area network, an end device entering a wireless wide area network, an end device connecting with a wired phone network, an end device connecting with a wired local area network, an end device connecting with a wired wide area network, an end device connecting with a cable television network, and/or an end device connecting with a satellite television network.

The method may, in some cases, compare and/or provide only a portion of any data. The portion of the data compared and/or provided by the method may possibly consist of an email header, a file name, a file size, a file type, and/or other descriptive information. Multimedia data in the method may, merely by way of example, consist of a JPG, a GIF, a MPG, an AVI, a MP3, a M4A, and/or a WMA file. Multimedia data may also consist of any file that allows for storage of video, graphics, and/or audio. Non-multimedia data in the method may, merely by way of example, consist of calendar appointments, contacts, text, email, and/or settings. Other non-multimedia data types possibly used by the method may consist of files substantially constituted by text or numerical information to be viewed by a user.

In some embodiments the method may further consist of registering with one or more data repositories. Registering with a data repository may possibly consist of purchasing a service plan with a service provider, opening an email account with a service provider, and/or storing data at the data repository. In an exemplary embodiment, the method will also consist of accessing the data repository with a web browser on an end device. In another exemplary embodiment, the comparison of data on the end device with data on the data repository may occur periodically. Such comparisons may occur without user intervention and/or at a variety of intervals, including, but not limited to, every 30 seconds, every minute, every 30 minutes, every hour, every 12 hours, or every day.

In some embodiments of the invention, the data repository may be connected with a communication subsystem and further connected with a translation subsystem. The communication subsystem may direct communication with the data repository. The translation subsystem my translate communication with the data repository. In some embodiments, the data repository may be capable of performing these functions. In other embodiments, these, or other functions, may not be necessary for the method.

In an embodiment with at least two data repositories, numerous techniques may be employed to connect the end device with all data repositories. In some embodiments, the method may connect the end device with a first data repository, connect the first data repository with a second data repository, and connect the end device with the second data repository through the connection made between the first data repository and the second data repository. Connecting the end device with the second data repository through the connection made between the first data repository and the second data repository may consist of a communication between the end device and the first data repository, a communication between the first data repository and the second data repository based on the communication between the end device and the first data repository, and a communication between the first data repository and the end device based on the communication between the first data repository and the second data repository.

In some embodiments the method may authenticate the user of the end device. Multiple techniques of authenticating the user are possible. Merely by way of example, the method may receive a user name and password and verify that the user name and password are associated with data associated with the user. In other embodiments, the method may receive a GSM SIM card number associated with an end device. The method may then verify that the GSM SIM card number is associated with the end device associated with the user.

Figure 1:
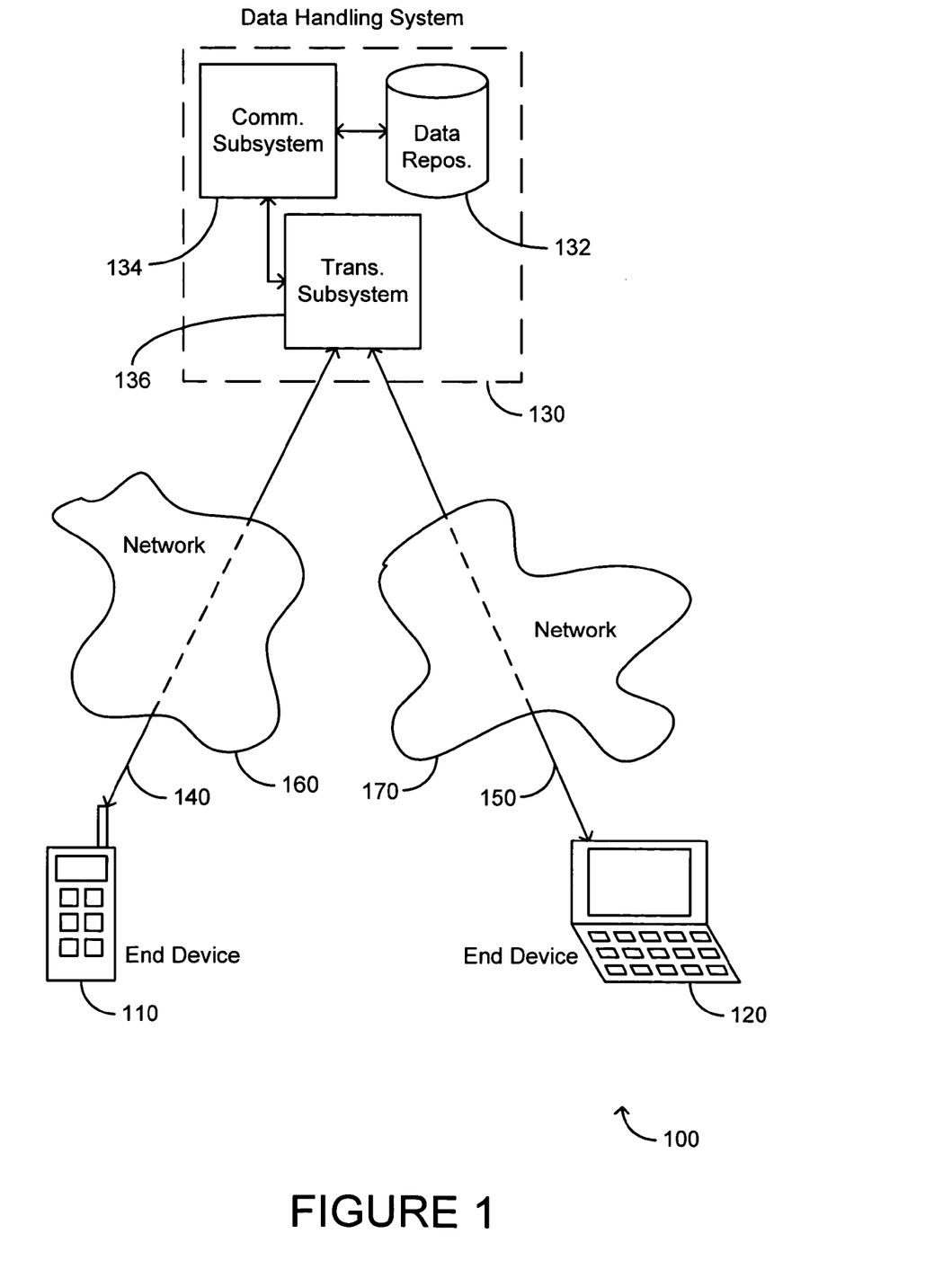
FIG. 1 is an example of a system capable of performing one embodiment of the invention using a single data repository.

Referring now to FIG. 1, one system 100 with the ability to implement one embodiment of the invention is shown. The system consists of end devices 110, 120 shown here as a cellular phone and a notebook computer, respectively. Though end devices 110, 120 are shown as a cell phone and a notebook computer, other end devices, as discussed above, may be used in the system. In this embodiment, the system also includes a data handling system 130. The data handling system 130 may consist of a data repository 132 connected with a communication subsystem 134 and a translation subsystem 136. The translation subsystem 136 may translate any communication with the data repository 132 that requires translation so that the end devices 110, 120 or the data repository 132 may utilize the communication. The communication subsystem 134 may direct communication with the data repository 132 in embodiments where the data repository 132 is not independently capable of directing such communication.

FIG. 1 also shows a first connection 140 between end device 110 and translation subsystem 136, and a second connection 150 between end device 120 and translation subsystem 136. The first connection 140 may be made over a first network 160. In this particular example, the first network 160 may be a cellular phone network. The second connection 150 may be made over a second network 170. In this particular example, the second network 170 may be a wireless local area network. The means of communications between the end devices 110, 120 and the data handling system 130 may consist of other wired or wireless networks known in the art as described above. In some embodiments, the first network 160 and the second network 170 may be the same network. For example, end devices 110, 120 in some embodiments may be a desktop computer and a laptop computer. In such an example, both end devices 110, 120 may connect with the translation subsystem 136 over the same wired local area network. Any network or system used for communication may also be a proprietary system known in the art such as those employed by GoodLink™, BlackBerry™, DirecTV™ or Dish Network™. Another exemplary architecture for implementing the invention can be found in U.S. patent application Ser. No. 11/255,089 filed Oct. 19, 2005 and entitled "Cross-Platform Support for a Variety of Media Types[,]" the content of which is incorporated herein by reference.

The system shown in FIG. 1 may be used to implement one possible embodiment of the invention. For example, a user may store data on end device 110. End device 110 may create connection 140 with translation subsystem 136 across network 160. The method may then compare data on end device 110 with data on data repository 132 by communicating through communication subsystem 134. The method may provide data from end device 110 to data repository 132 if the comparison reveals that data on end device 110 is not present or is outdated on data repository 132. Likewise, the user may later use end device 120. End device 120 may create connection 150 with translation subsystem 136 across network 170. The method may compare data on end device 120 with data on data repository 132 by communicating through communication subsystem 134. The method may then provide data stored on data repository 132 to end device 120 if the comparison reveals that data on data repository 132 is not present or is outdated on end device 120. In this manner, the method has provided synchronization between the two end devices 110, 120 and data repository 132.

Figure 2:
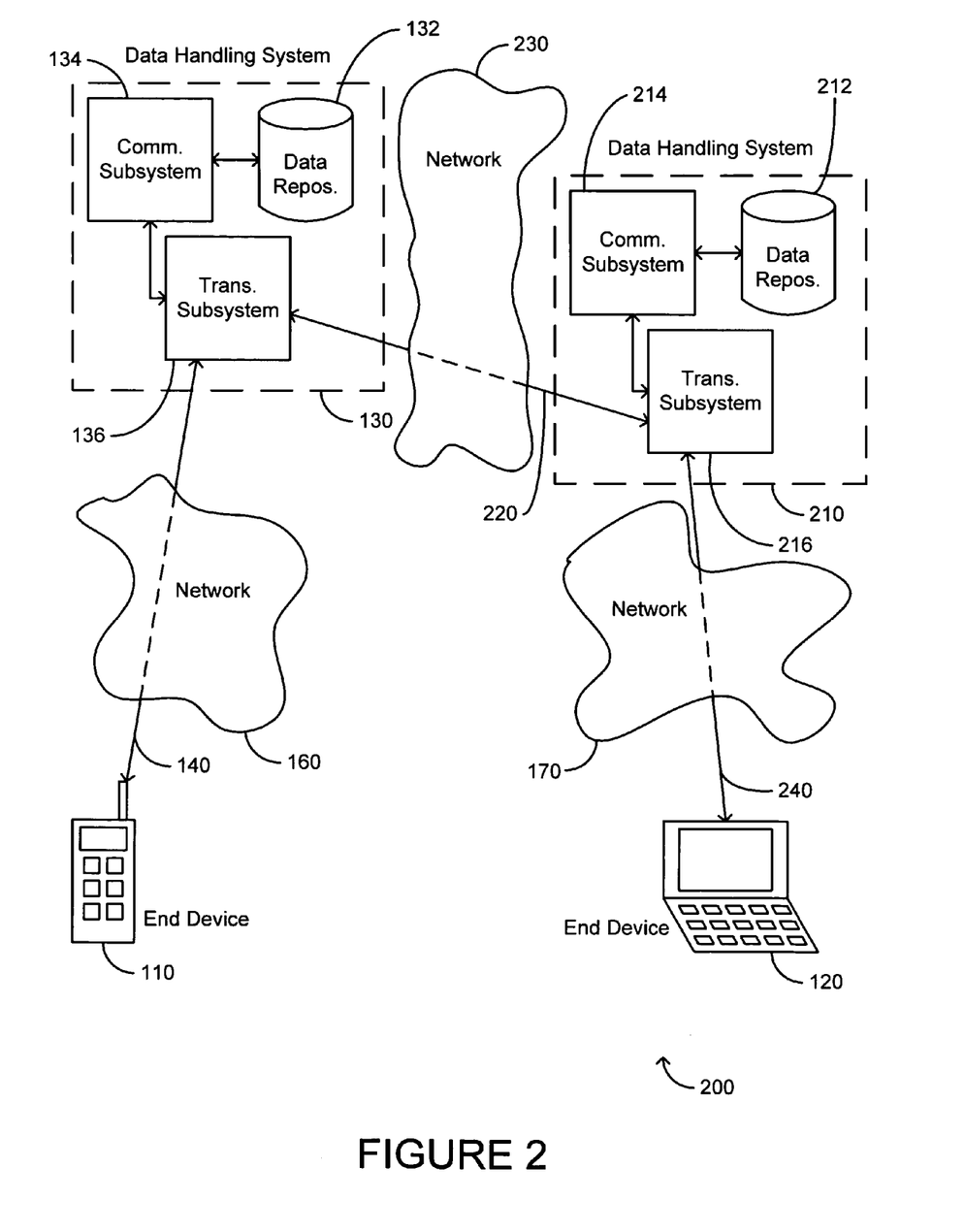
FIG. 2 is an example of a system capable of performing another embodiment of the invention using multiple data repositories.

Referring to FIG. 2, a system 200 with the ability to implement another embodiment of the invention is shown. The system 200 consists of end devices 110, 120 shown here as a cellular phone and a notebook computer, respectively. Though the end devices 110, 120 are shown as a cell phone and a notebook computer, other end devices, as discussed above, may be used in the system. In this embodiment, the system also includes a first data handling system 130 and a second data handling system 210. Data handling systems 130, 210 may consist of data repositories 132, 212 connected with communication subsystems 134, 214 and translation subsystems 136, 216. Translation subsystems 136, 216 may translate any communication with data repositories 132, 212 that require translation so that end devices 110, 120 or data repositories 132, 212 may utilize the communication. Communication subsystems 134, 214 may direct communication with data repositories 132, 212 in embodiments where data repositories 132, 212 are not independently capable of directing such communication.

FIG. 2 also shows a first connection 140 between end device 110 and the first data handling system 130, a second connection 150 between end device 120 and the second data handling system 210, and a third connection 220 between the first data handling system 130 and the second data handling system 210. The first connection 140 may be made over a first network 160. In this particular example, the first network 160 may be a cellular phone network. The second connection 240 may be made over a second network 170. In this particular example, the second network 170 may be a wireless local area network. The third connection 220 may be made over a third network 230. In this particular example, the third network 230 may be the internet or other wired wide area network. The means of communications between any one or more of end devices 110, 120 and data handling systems 130, 210 may consist of other wired or wireless networks known in the art as described above. In some embodiments, any one or more of the described networks may also be the same network. Merely by way of example, end devices 110, 120 in some embodiments may be a desktop computer and a notebook computer. In such an example, both devices may connect with translation systems 136, 216 over the same wired local area network. Any network or system used for these communications may also be a proprietary system or other architecture as described above.

The system shown in FIG. 2 may be used to implement one possible embodiment of the invention. For example, a user may store data on end device 110. End device 110 may then create connection 140 with translation subsystem 136 across network 160. The method may compare data on end device 110 with data on data repository 132 by communicating through communication subsystem 134. The method may provide data from end device 110 to data repository 132 if the comparison reveals that data on end device 110 is not present or is outdated on data repository 132. Likewise, the user may later store data on end device 120. End device 120 may create connection 240 with translation subsystem 216 across network 170. The method may compare data on end device 120 with data on data repository 212 by communicating through communication subsystem 214. The method may provide data stored on end device 120 to data repository 212 if the comparison reveals that data on end device 120 is not present or is outdated on data repository 212. Furthermore, in this embodiment, second data handling system 210 may communicate with first data handling system 130 and compare data on end device 120 with data on data repository 132. The method may provide data from data repository 132 to end device 120 if the comparison reveals that data on data repository 132 is not present or is outdated on end device 120.

Figure 3:
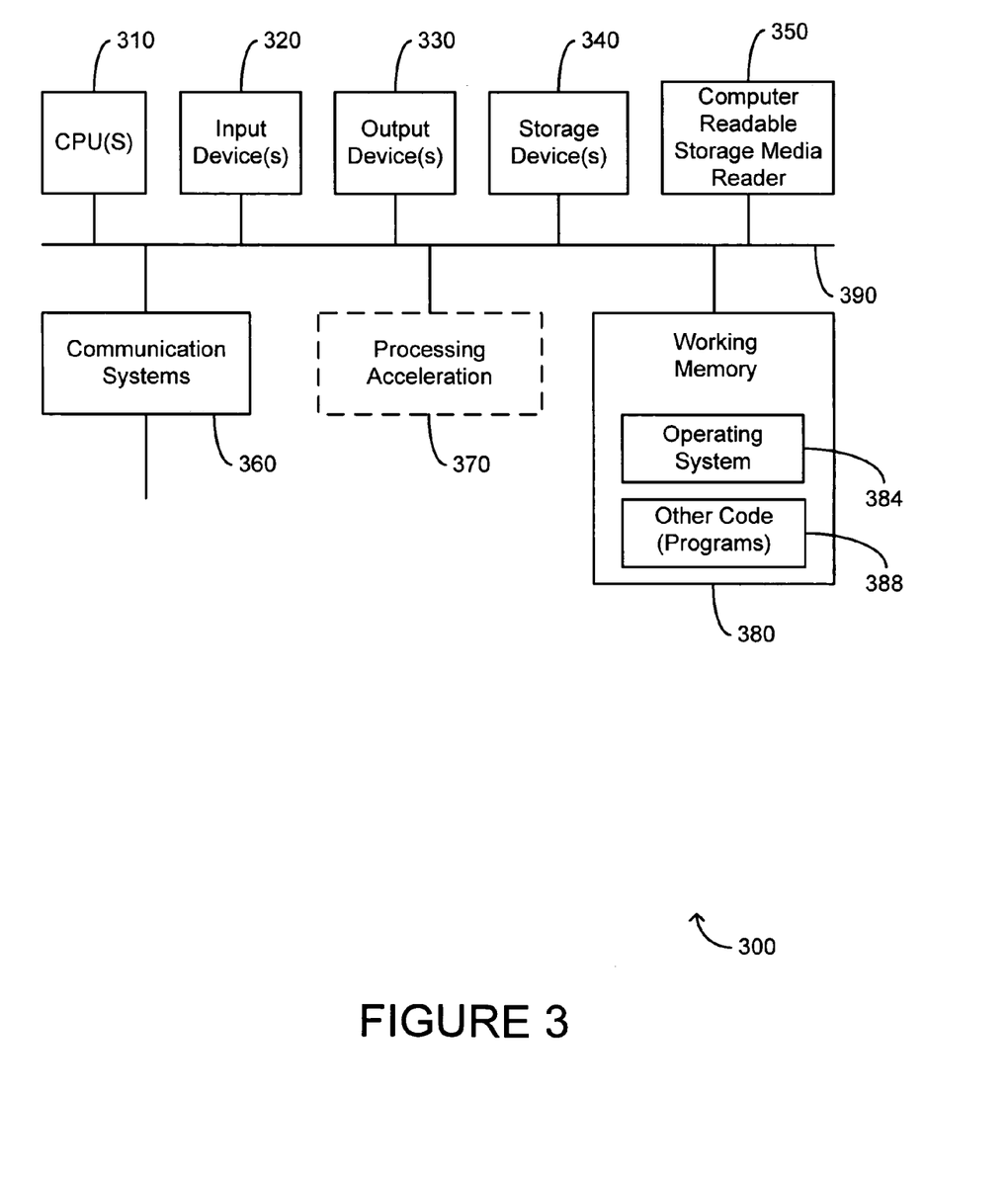
FIG. 3 is an example of a computer system capable of implementing the methods, or a particular portion of the methods, of the present invention.

FIG. 3 is a block diagram illustrating an exemplary computer system in which embodiments of the present invention may be implemented. This example illustrates a computer system 300 such as may be used, in whole, in part, or with various modifications, to provide the functions of the end devices, the translation subsystems, the communication subsystems, the data repositories, and/or other system providing function such as those discussed above.

The computer system 300 is shown comprising hardware elements that may be electrically coupled via a bus 390. The hardware elements may include one or more central processing units (CPUs) 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, etc.), and working memory 380, which may include RAM and ROM devices as described above. In some embodiments, the computer system 300 may also include a processing acceleration unit 370, which can include a DSP, a special-purpose processor and/or the like.

The computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. The communications system 360 may permit data to be exchanged with a network and/or any other computer described above with respect to the system 300.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Software of computer system 300 may include code 388 for implementing any or all of the function of the various elements of the architecture as described herein. For example, software, stored on and/or executed by a computer system such as system 300, can provide the functions of the end devices, the translation subsystems, the communication subsystems, and/or the data repositories. Methods implementable by software on some of these components will be further discussed below.

Figure 4:
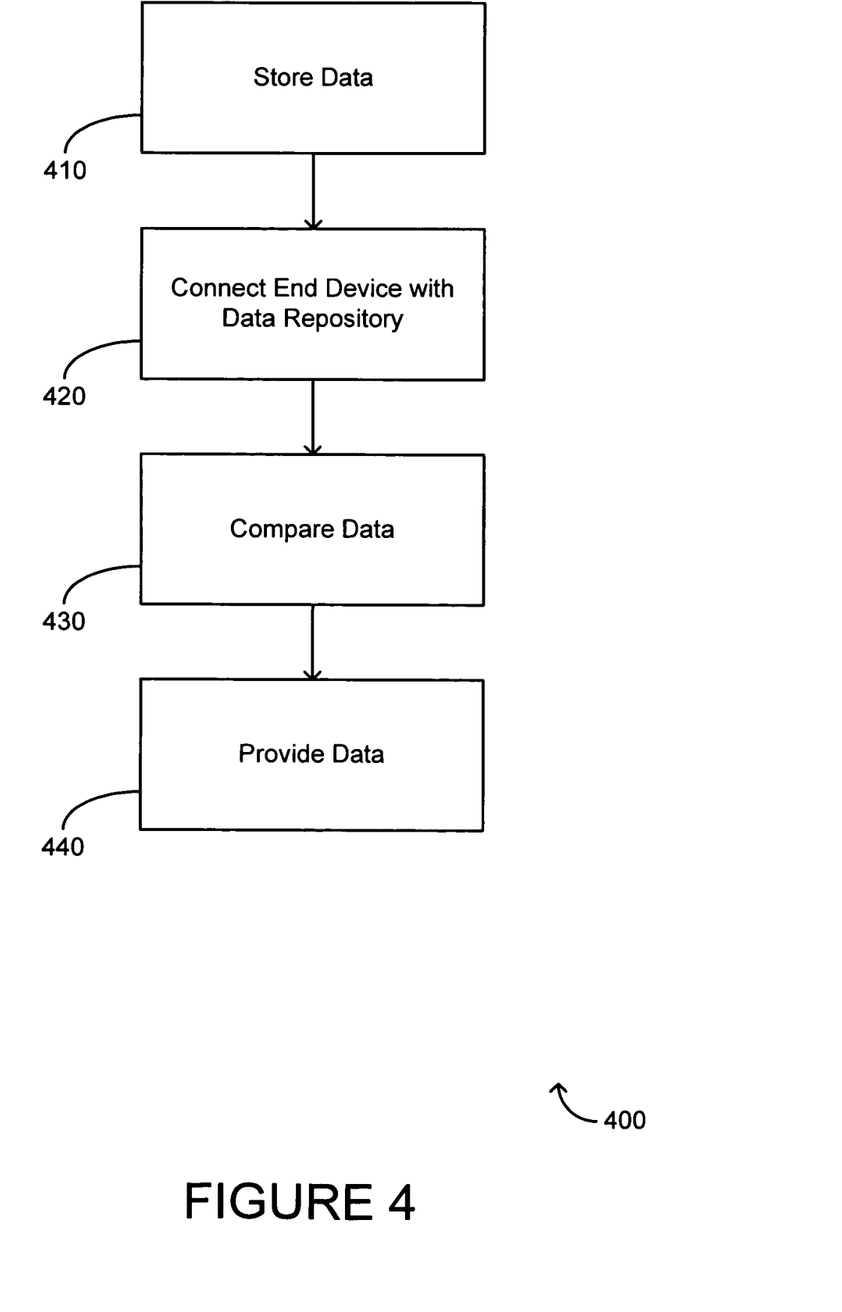
FIG. 4 shows one possible method of the invention.

In FIG. 4, one possible method 400 of the invention is shown. The method 400 may consist of storing data 410 on an end device. Multiple techniques exist for performing such a step. Merely by way of example, a user may use various input devices such as a digital camera, keypad, mouse, and/or keyboard to store data onto an end device. A user may also use a network connection or media reader to store data onto the end device. Other systems may also automatically, or at a user's direction, store data on the end device. Merely by way of example, a cellular phone network may deliver text and/or graphical messages to a cellular phone and store such data thereon. Other networks may deliver content at the user's request, possibly due to a purchase by the user.

The method 400 may further consist of connecting the end device with the data repository 420. Merely by way of example, a cellular phone may enter a wireless phone network, wherein the wireless phone network may connect the cellular phone with the data repository; a handheld computer may enter a wireless phone network and connect with a proprietary network, wherein either the wireless phone network or the proprietary network may connect the handheld computer with the data repository; or a video game console may connect with a wired local area network, wherein the wired local area network may connect the video game console with the data repository.

The method 400 may compare data 430 on the end device with the data on the data repository to determine if data is more recent on the end device or the data repository. The method may, in other embodiments, recognize that data at the end device is new and not compare data 430 on the end device with the data on the data repository. Data may be recognized as new possibly because the data was created at the end device. Merely by way of example, a photo taken with an end device that is a cellular phone would be recognized as new when the photo was taken with the cellular phone. The method 400 may furthermore provide data 440 from the end device to the data repository or from the data repository to the end device, possibly based upon the comparison of the data or recognition that the data is new at the end device. In some embodiments a user may define the criteria for determining when and what data to provide from the end device to the data repository or from the data repository to the end device. Merely by way of example, a user may set criteria that no new multimedia data over a certain size may be provided to a particular end device. Other possible criteria may include not allowing a data repository to provide data to an end device if the difference in the age of the data is less than a certain period of time.

Figure 5:
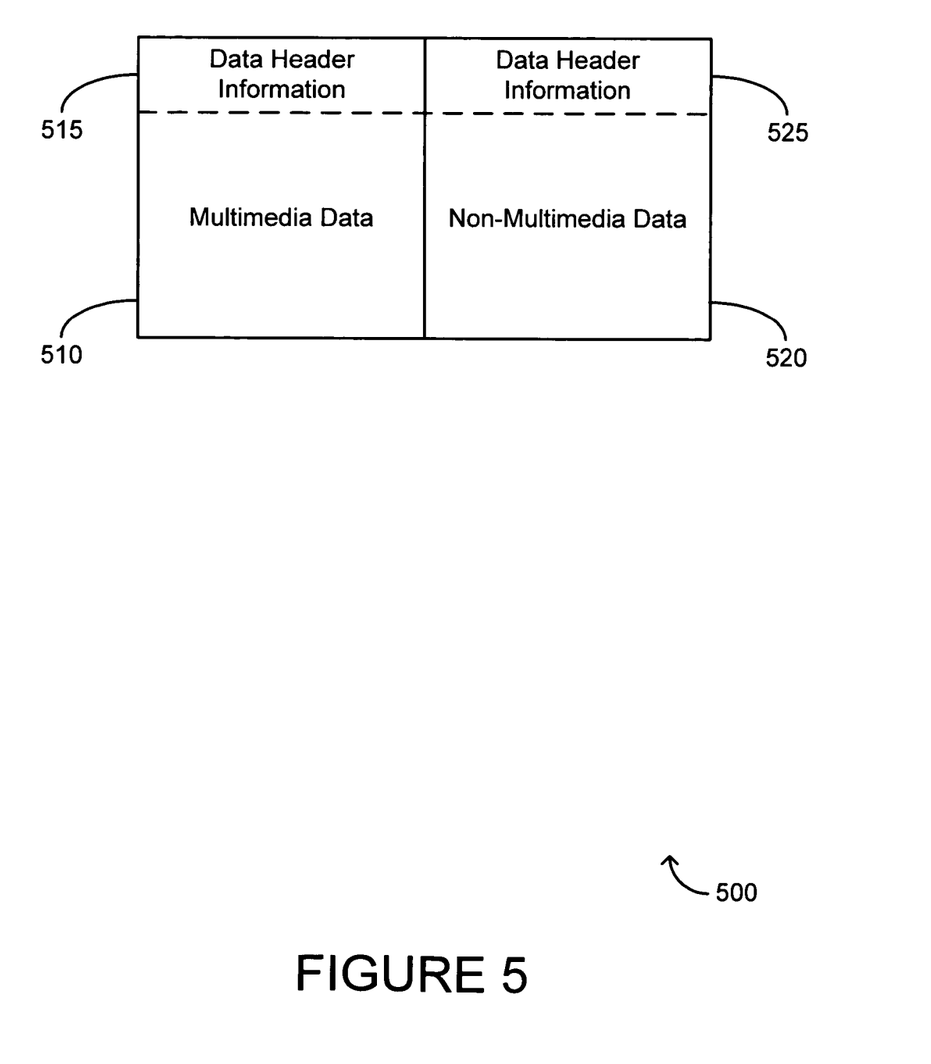
FIG. 5 shows one possible composition of data within the invention.

In FIG. 5, one possible composition of data 500 is shown. Data 500 may possibly consist of multimedia data 510 and non-multimedia data 520. Both multimedia data 510 and non-multimedia data 520 may further consist of data header information 515, 525. Data header information 515, 525 may describe or characterize the multimedia data 510 and non-multimedia data 520. Data header information 515, 525 may consist of an email header, a file name, a file size, a file type, and/or other descriptive information. Multimedia data 510 may consist of any one or more JPG, GIF, MPG, AVI, MP3, M4A and/or WMA files. Non-multimedia data 520 may, merely by way of example, consist of any one or more calendar appointments, contacts, text, email and/or settings.

Figure 6:
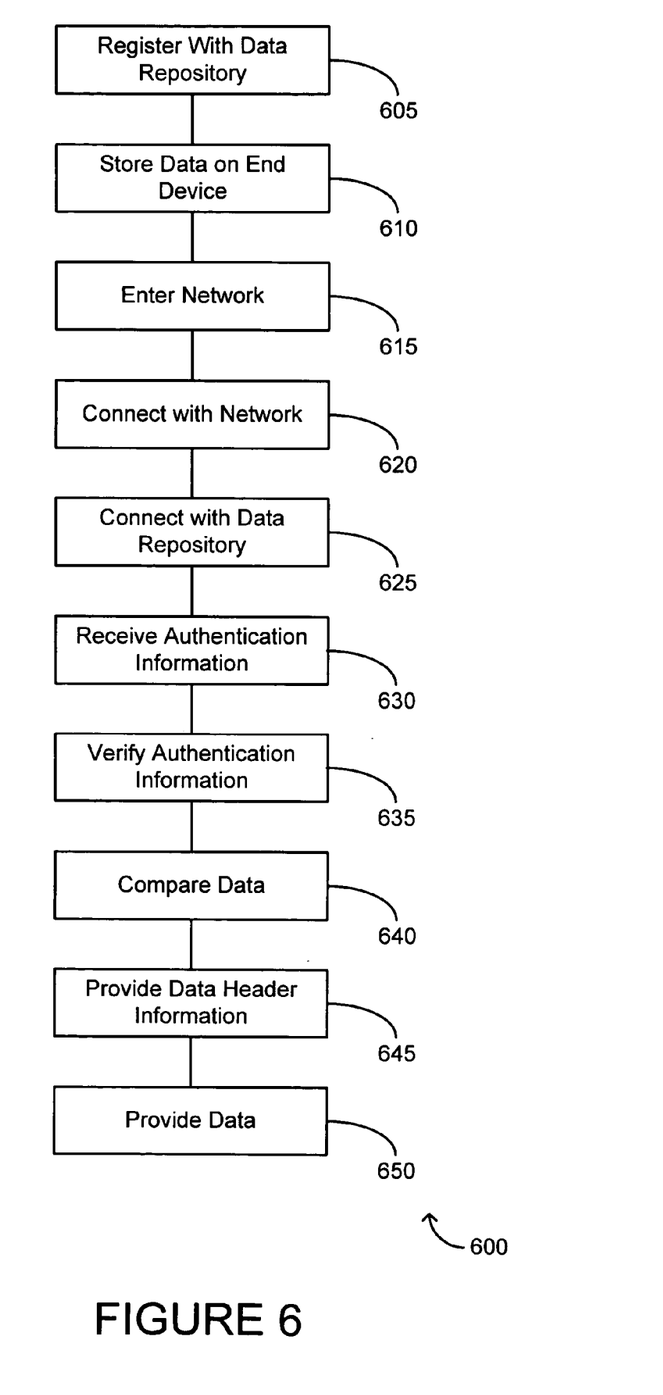
FIG. 6 shows another possible method of the invention

FIG. 6 illustrates one possible embodiment of the invention. In one possible example, a user may register with a data repository 605 by purchasing a cellular phone and a service contract with a cellular phone service provider. The user may thereafter store data on the cellular phone 610. Merely for the purposes of this example, the user may store three non-multimedia contacts consisting of a name and a phone number in each contact, a multimedia JPG file consisting of an image taken with the cellular phone's camera, and a multimedia MP3 file consisting of a ring-tone downloaded to the cellular phone through a computer patch cable. When the user enters a wireless phone network 615 after storing this data, the cellular phone may connect with the network 620 by registering with the network. The cellular phone may also connect through the network with a data repository 625.

Once connected with the data repository, the cellular phone may transmit its GSM SIM Card Number and the data repository, or a system in communication therewith, may receive this authentication information 630. The data repository, or the system in communication therewith, may verify this information 635 before allowing any further activity. After authentication has occurred, the repository, or the system in communication therewith, may compare data 640 on the cellular phone with data on the data repository to determine if any data is more current or does not exist on either the cellular phone or the data repository.

In this example, it may be determined that the two non-multimedia contacts, the multimedia JPG file and the multimedia MP3 file are not located on the data repository. The cellular phone may provide the aforementioned data to the data repository 650, therefore synchronizing the data on the data repository with the data on the cellular phone.

Continuing with FIG. 6 and this example, the user may later use a notebook computer. The computer may have a wireless networking card and enter into a wireless local area network 615. The notebook computer may connect with the wireless local area network 620 and connect with the data repository 625. The user may then open a web browser on the notebook computer and access a web page which may be a portal to the contents of the data repository. The data repository, or a system in communication therewith, may request authentication in the form of a username and password. The user may enter the appropriate information into the notebook computer and the data repository, or the system in communication therewith, may receive that information 630. The data repository or system may verify the authentication information 635 and allow the user to view the data on the data repository through the web page portal. In this example, and in this embodiment, the user could view the three contacts, the JPG file and the MP3 file that were previously provided to the data repository from the cellular phone.

Instead of accessing the data repository through the web page portal, in some embodiments the user with the notebook computer may enter a wireless local area network 615 and connect with the network 620. The notebook computer may thereafter, periodically, and without user intervention, connect to the data repository 625, compare data 640, and provide data 650 between the cellular phone and the notebook computer as necessary to synchronize the data on each. The data repository or a system in communication therewith may receive authentication information 630 and verify the authentication information 635 during such a process. In this example, and in this embodiment, the method might provide the notebook computer with the three contacts, the JPG file and the MP3 file that were previously provided to the data repository from the cellular phone.

If the user of the notebook computer in this example, using this or possibly other embodiments, inputs two non-multimedia contacts using the notebook computer's keyboard and also uploads a multimedia MPG file consisting of a video, possibly from the notebook computer's CD-ROM or internet connection, the following may occur: during the next comparison of data 640 the method may determine that the two contacts and the MPG file present on the notebook computer are not present on the data repository; the method may then provide this data 650 to the data repository, thereby synchronizing the notebook computer and the data repository. An alternative possibility is that no comparison of the data 640 may occur. The method may in this circumstance recognize that the two contacts and the MPG file are new data and provide the data 650 to the data repository, thereby synchronizing the notebook computer and the data repository.

If the user in this example, and in this embodiment, then accesses the cellular phone mentioned previously, the cellular phone, if still connected with a wireless phone network and further connected with the data repository, may at some time compare data 640 with the data repository. Based on such comparison, this embodiment of the invention may provide data header information 645 and data 650 from the data repository to the cell phone. As above, the method may not compare the data 640 on the repository with the data on the cellular phone, but may merely recognize that there is new data on the data repository which did not originate from the cellular phone and provide data header information 645 and data 650 from the data repository to the cell phone. In the present example, the embodiment may provide the data 650 of the two new contacts on the data repository to the cellular phone, but only provide data header information 645 for the MPG file if the method determines that characteristics of the system practicing the method mean that it will be inefficient to provide the entire MPG file to the cellular phone. The data header information in this example may constitute a file name, a file size, or a file type. A user may, after evaluating the data header information, possibly override the method's decision and instruct the system to provide the entire MPG file to the cellular phone.

At this point, in the example described, the cellular phone may have stored on it five contacts, one JPG file, one MP3 file, and data header information of one MPG file, if not the MPG file in its entirety; the data repository may have stored on it five contacts, one JPG file, one MP3 file and one MPG file; and the notebook computer may have stored five contacts, one JPG file, one MP3 file and one MPG file. It is thereby shown, in this embodiment, and in this example, how the method may provide synchronization of multiple end devices and a data repository. Use of other embodiments of the invention may allow for synchronization of multiple data repositories as well.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The invention has now been described in detail for purposes of clarity and understanding. However, it will be appreciated that certain changes and modifications may be practiced within the scope of the appended claims.

What is claimed is:

1. A method for synchronizing an end device comprising:
storing data on an end device, wherein the data is comprised of multimedia data and non-multimedia data;
connecting the end device with at least two data repositories over a first wireless network, without user interaction, in response to the end device entering the first wireless network, each of the at least two data repositories being separate from each other and in communication over a second wireless network different from the first, each of the at least two data repositories also being separate from the end device and directly accessible by the end device over the first wireless network;
translating, via respective translation subsystems of the at least two data repositories, communications from the end device to either of the at least two data repositories, wherein translated communications are capable of being utilized by each of the at least two data repositories;
translating, via the translation subsystems of the at least two data repositories, communications between the at least two data repositories over the second wireless network, wherein translated communications are capable of being utilized by each of the at least two data repositories receiving the communications;
comparing at least a portion of the data on the end device with at least a portion of the data on each of the at least two data repositories to determine if at least a portion of the data is more recent on the end device or on either of the at least two data repositories; and
receiving at least a portion of the multimedia data from the end device at one or more of the at least two data repositories, based at least in part upon a determination from the comparison of the data that the at least a portion of the multimedia data is more recent on the end device.

2. The method, as in claim 1, wherein the end device comprises at least one of:
a cellular phone;
a personal data assistant;
a portable music player;
a handheld computer;
a notebook computer;
a laptop computer;
a desktop computer;
a video game console;
a cable television receiver; or
a satellite television receiver.

3. The method, as in claim 1, wherein the first wireless network is selected from the group consisting of:
a wireless phone network;
a wireless local area network;
a wireless wide area network; and
a satellite television network.

4. The method, as in claim 1, wherein the portion of the data comprises data header information.

5. The method, as in claim 4, wherein data header information comprises at least one of:
an e-mail header;
a file name;
a file size; or
a file type.

6. The method, as in claim 1, wherein multimedia data comprises at least one of:
a JPG file;
a GIF file;
a MPG file;
an AVI file;
a MP3 file;
a M4A file;
a M4P file; or
a WMA file.

7. The method, as in claim 1, wherein non-multimedia data comprises at least one of:
calendar appointments;
contacts;
text;
e-mail; or
settings.

8. The method, as in claim 1, further comprising registering with one or more of the at least two data repositories.

9. The method, as in claim 8, wherein registering with the one or more of the at least two data repositories comprises at least one of:
purchasing a service plan from a service provider;
opening an e-mail account with a service provider; or
storing data at the one or more of the at least two data repositories.

10. The method, as in claim 1, further comprising accessing the at least two data repositories with a web browser on an end device.

11. The method, as in claim 1, wherein comparing data on the end device with data on the at least two data repositories occurs periodically.

12. The method, as in claim 1, wherein comparing data on the end device with data on the at least two data repositories occurs without user intervention.

13. The method, as in claim 1, wherein each of the at least two data repositories is connected with a communication subsystem and a translation subsystem, and wherein the communication subsystem directs at least a portion of any communication with each of the at least two data repositories, and wherein the translation subsystem translates at least a portion of any communication with each of the at least two data repositories.

14. The method, as in claim 1, wherein connecting the end device with at least two data repositories comprises:
connecting the end device with a first data repository;
connecting the first data repository with a second data repository; and
connecting the end device with the second data repository through the connection made between the first data repository and the second data repository.

15. The method, as in claim 14, wherein connecting the end device with the second data repository through the connection made between the first data repository and the second data repository comprises:
a communication between the end device and the first data repository;
a communication between the first data repository and the second data repository based at least in part on the communication between the end device and the first data repository; and
a communication between the first data repository and the end device based at least in part on the communication between the first data repository and the second data repository.

16. A system for synchronizing an end device, comprising:
an end device that stores data comprising multimedia data and non-multimedia data;
a first data repository separate from the end device and in communication with the end device over a first wireless network, the first data repository directly accessible by the end device over the first wireless network, wherein the first data repository includes a first translation subsystem, the first translation subsystem translating communications between the first data repository and the end device; and
a second data repository separate from the first data repository and the end device and in communication with the first data repository over a second wireless network different from the first, the second data repository directly accessible by the end device over the first wireless network, wherein the second data repository includes a second translation subsystem, the second translation subsystem translating communications between the second data repository and at least one of the end device and first data repository;
wherein the first translation subsystem further translates communications between the first data repository and second data repository,
wherein translated communications are capable of being utilized by the end device, first data repository, or second data repository receiving the communications,
wherein the at least a portion of the data on the end device is compared with at least a portion of the data on each of the first and second data repositories to determine if at least a portion of the data is more recent on the end device or on either of the first and second data repositories, and wherein at least a portion of the multimedia data from the end device is received by at least one of the first or second data repositories, based at least in part upon the comparison of the data.

17. The system, as in claim 16, wherein the end device comprises at least one of:
a cellular phone;
a personal data assistant;
a portable music player;
a handheld computer;
a notebook computer;
a laptop computer;
a desktop computer;
a video game console;
a cable television receiver; or
a satellite television receiver.

18. The system, as in claim 16, wherein the portion of the data comprises data header information comprising at least one of:
an e-mail header;
a file name;
a file size; or
a file type.

19. The system, as in claim 16, wherein multimedia data comprises at least one of:
a JPG file;
a GIF file;

a MPG file;
an AVI file;
a MP3 file;
a M4A file;
a M4P file; or
a WMA file.

20. The system, as in claim 16, wherein non-multimedia data comprises at least one of:
calendar appointments;
contacts;
text;
e-mail; or
settings.

\* \* \* \* \*